(12) United States Patent
Muller et al.

(10) Patent No.: US 10,697,809 B1
(45) Date of Patent: Jun. 30, 2020

(54) SENSOR HOUSING WITH MOUNTING PLATE AND ALIGNMENT INDICATION

(71) Applicant: PETASENSE, INC., San Jose, CA (US)

(72) Inventors: Peter Muller, Portland, OR (US); Harsha Mokkarla, Los Altos Hills, CA (US); Abhinav Krushraj, San Jose, CA (US); Arun Santhebennur, Cupertino, CA (US); Simon Xu, San Francisco, CA (US)

(73) Assignee: PETASENSE INC., San Jose, CA (US)

( * ) Notice: Subject to any disclaimer, the term of this patent is extended or adjusted under 35 U.S.C. 154(b) by 119 days.

(21) Appl. No.: 15/530,977

(22) Filed: Mar. 31, 2017

(51) Int. Cl.
| | |
|---|---|
| *G01D 11/24* | (2006.01) |
| *G01D 11/30* | (2006.01) |
| *G01K 1/14* | (2006.01) |
| *G01K 1/08* | (2006.01) |
| *F16C 19/52* | (2006.01) |
| *G01H 1/00* | (2006.01) |
| *G01M 13/045* | (2019.01) |

(52) U.S. Cl.
CPC .......... *G01D 11/245* (2013.01); *G01D 11/30* (2013.01); *G01K 1/08* (2013.01); *G01K 1/14* (2013.01); *F16C 19/525* (2013.01); *F16C 19/527* (2013.01); *G01H 1/003* (2013.01); *G01M 13/045* (2013.01)

(58) Field of Classification Search
CPC ................. G01D 11/245; G01D 11/30; F16C 19/52–527

USPC .......................................................... 73/431
See application file for complete search history.

(56) References Cited

U.S. PATENT DOCUMENTS

| 4,825,710 A * | 5/1989 | Koneval ............. G01D 11/245 285/12 |
| 4,899,586 A * | 2/1990 | Koneval ............. G01D 11/245 73/431 |
| 9,322,678 B1 * | 4/2016 | Stawitzky ............ G01D 11/245 |
| 2007/0157734 A1 * | 7/2007 | Skwara ................. G01L 19/086 73/708 |
| 2010/0089159 A1 * | 4/2010 | Younsi ................... H02K 11/20 73/514.32 |
| 2012/0279842 A1 * | 11/2012 | Borgwarth ............. H01H 19/20 200/568 |
| 2014/0152426 A1 * | 6/2014 | Murphy .................. F16C 19/52 340/10.51 |
| 2014/0152451 A1 * | 6/2014 | Murphy ................ F16C 19/525 340/682 |

(Continued)

OTHER PUBLICATIONS

Kistler Instrument Corp., Catalog: Acceleration, 2015 (Year: 2015).*

(Continued)

*Primary Examiner* — David L Singer
(74) *Attorney, Agent, or Firm* — IPR Law Group PC

(57) ABSTRACT

A sensor, having: a mounting plate, the mounting plate fastened to a device to be monitored and having an alignment indication readable by a human; a sensor module, the sensor module configured to monitor the device; a housing and a fastener, the housing secured to the mounting plate by the fastener; a controller, the controller including a circuit board having logical and communication functionality; and an inner housing, the inner housing retaining a battery and also providing a mounting surface for the controller.

11 Claims, 7 Drawing Sheets

(56) References Cited

U.S. PATENT DOCUMENTS

| | | | | |
|---|---|---|---|---|
| 2015/0015405 A1* | 1/2015 | Bark | ............... | G01M 13/045 |
| | | | | 340/682 |
| 2015/0241463 A1* | 8/2015 | Kraige | ............... | G01P 15/097 |
| | | | | 73/514.29 |
| 2016/0041068 A1* | 2/2016 | Wascat | ............... | G01M 99/005 |
| | | | | 702/39 |
| 2017/0074691 A1* | 3/2017 | Baird | ............... | G01D 11/24 |

OTHER PUBLICATIONS

Connection Technology Center, Inc., 2014-2015 product catalog (Year: 2014).*

Brüel & Kjær Sound & Vibration Measurement, Product Data: Triaxial CCLD Accelerometer Types 4529-B and 4529-B-001, 2014 (Year: 2014).*

Connection Technology Center, Inc., Triaxial Sensor Mounting Considerations, 2008 (Year: 2008).*

* cited by examiner

SENSOR HOUSING WITH MOUNTING PLATE AND ALIGNMENT INDICATION

FIELD OF THE INVENTION

The present invention relates broadly to equipment monitoring, and more specifically to sensors having monitoring capabilities that relate operating conditions and overall device health to a user or external device.

BACKGROUND OF THE INVENTION

Equipment maintenance includes monitoring working equipment to determine operating conditions of devices. Equipment such as motors, pumps, and other mechanical devices wear out over time due to moving parts or other aspects that eventually fail. To keep a plurality of equipment operating properly, monitoring and maintenance by trained personnel is performed to ensure problems are identified as early as possible so that appropriate actions can be taken for maintenance and repair of the equipment. Currently, sensors that monitor various operational parameters of such equipment and communicate this data to external data collection devices or service personnel are used in manufacturing plants. However, sensors themselves often need service and maintenance, which typically requires removing the sensor, providing whatever actions are necessary, such as recalibrating the sensor or replacing a sensor component, and then re-installing the sensor on the monitored equipment. As a result proper placement of the sensor is vital in many instances to obtain meaningful data. The correct placement and alignment of the sensor is a labor-intensive process that is error prone. As a result the data obtained by the sensor, and thus the usefulness of the sensor can be easily compromised, which in turn can result in a catastrophic failure of the monitored equipment.

SUMMARY OF THE INVENTION

In one aspect, the present invention provides a sensor, having: a mounting plate, the mounting plate fastened to a device to be monitored and having an alignment indication readable by a human; a sensor module, the sensor module configured to monitor the device; a housing and a fastener, the housing secured to the mounting plate by the fastener; a controller, the controller including a circuit board having logical and communication functionality; and an inner housing, the inner housing retaining a battery and also providing a mounting surface for the controller.

In an embodiment, the sensor is disposed in a perpendicular relationship with respect to the device. In an embodiment, the fastener includes a knurled surface. In an embodiment, the fastener includes a faceted surface. In an embodiment, the sensor includes a curved member that accommodates a curved surface of a device. In an embodiment, the sensor includes a base attached to the mounting plate between the mounting plate and the bottom surface of the inner housing. In an embodiment, a boss is presented between the mounting plate and the base, and only allows attachment of the base to the mounting plate in a single orientation, thus preventing an incorrect installation. In an embodiment, the sensor module comprises a vibration sensor. In an embodiment, the sensor module comprises a temperature sensor.

In another aspect, the present invention provides a sensor having: a mounting plate, the mounting plate attached to a device to be monitored, the mounting plate including directional markings indicating proper placement of a sensor on the mounting plate; a sensing module, the sensing module configured to observe characteristics exhibited by the device to be monitored; a circuit board, the circuit board in communication with the sensing module, the circuit board including controller and communication functions; an inner housing, the inner housing including a battery, the battery supplying electrical current to the sensing module and the circuit board; and a housing that provides an enclosure for the inner housing, sensing module and mounting plate.

In an embodiment, the sensor further includes a base, the base connected to the mounting plate and having a threaded portion. In an embodiment, the housing includes a lip dimensioned to mate with a fastener that includes threads that match the threaded portion of the base.

Numerous additional features and advantages of the present invention will become apparent to those skilled in the art upon reading the following detailed description, when considered in conjunction with the accompanying drawings.

DETAILED DESCRIPTION

Figure 1:
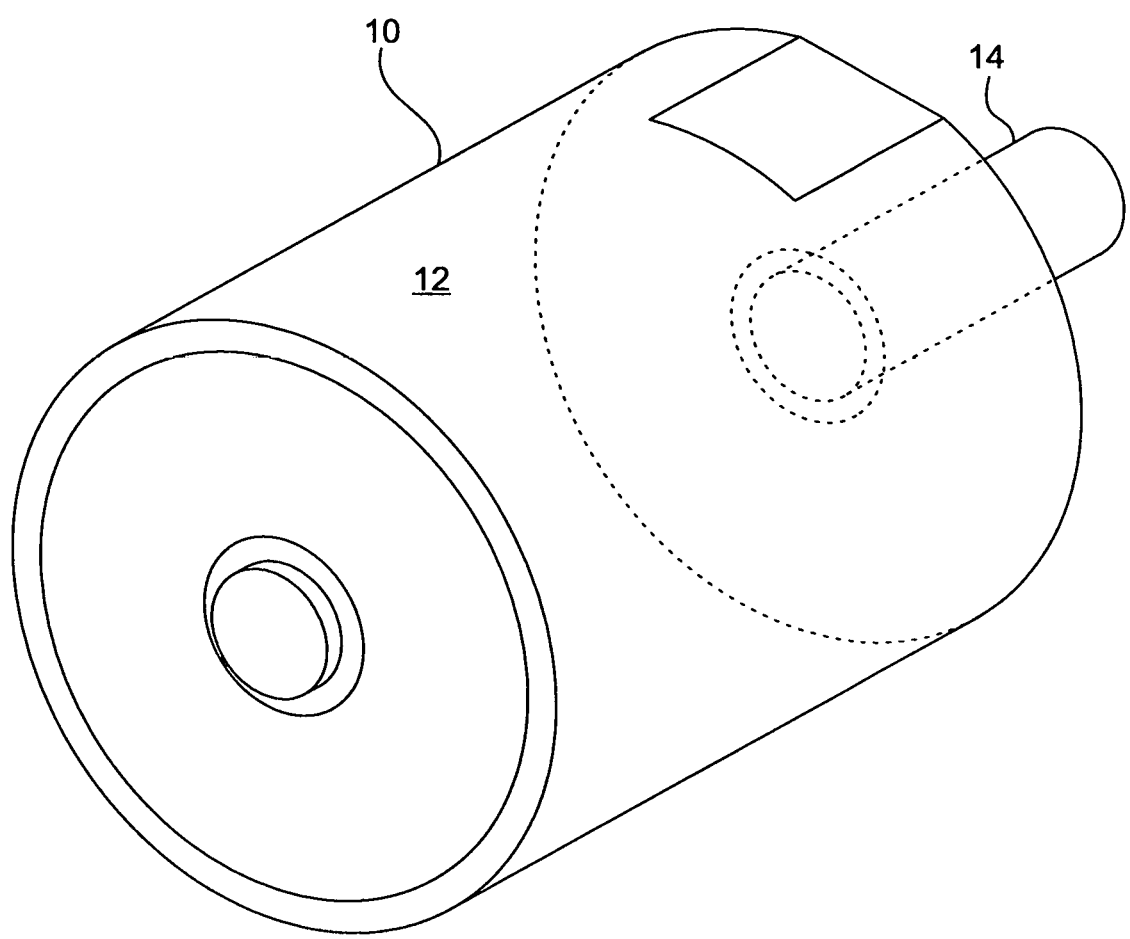
FIG. 1 shows a perspective view of a device to which the sensor of the present invention attaches.

Directing attention to FIG. 1, there is shown generally a device 10, having a body 12, and a moving portion 14. Element 14 can be a rotating shaft, or a piston, a bearing, or another component that is capable of movement that is repetitive and is monitored for detection of wear or fault through a variety of observable characteristics, such as vibration, temperature, noise, electrical or physical characteristic, or any other detectable characteristic that can be sensed and evaluated for making a determination of the health of device 10 for the purposes of replacement and maintenance, power usage, system efficiency, or determining any using other useful information from the operation of device 10. Thus, as shown, device 10 is to be monitored by a sensor that observes the operation of device 10 and element 14 and the surrounding environment.

Figure 2:
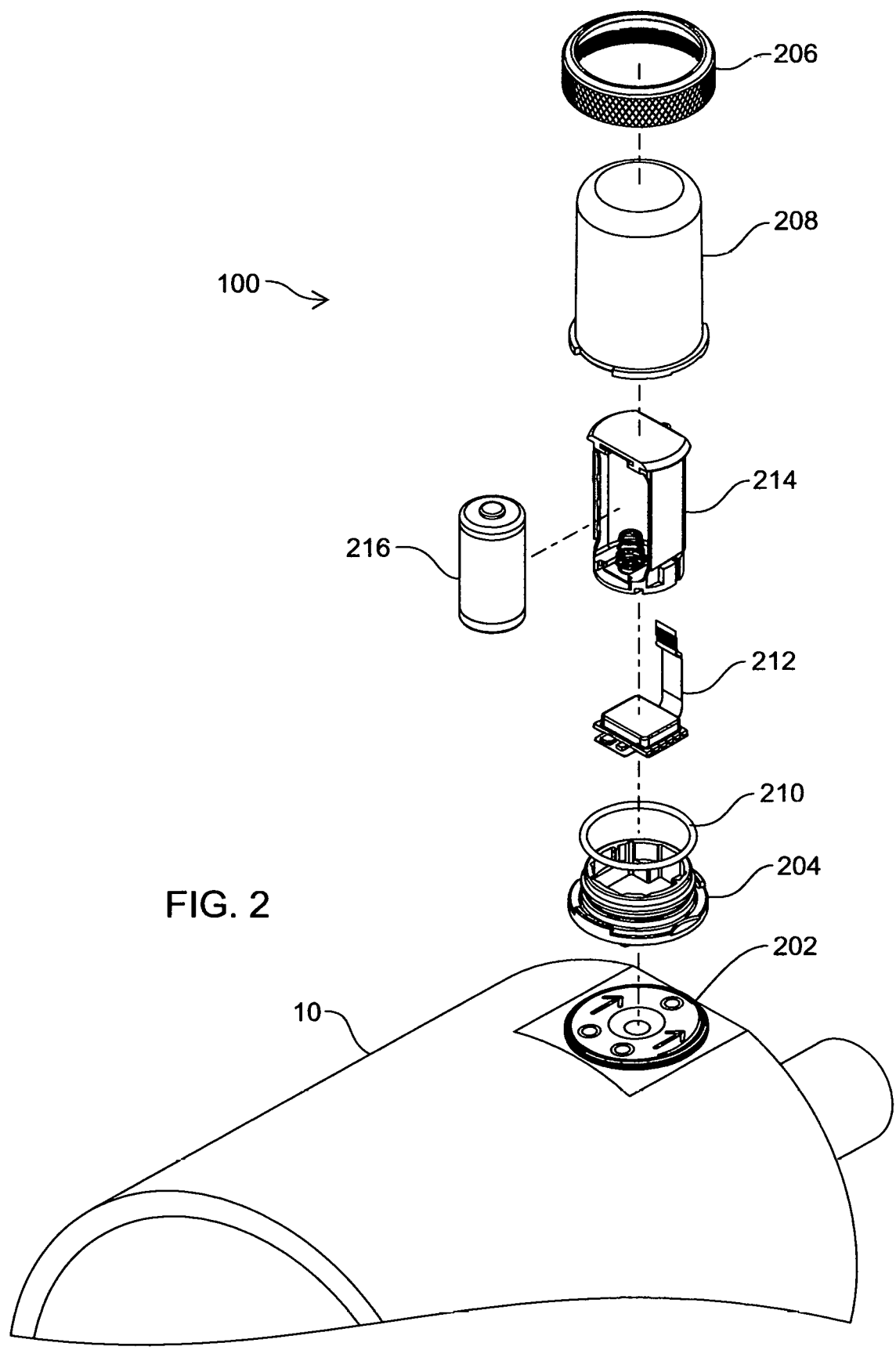
FIG. 2 shows the device of FIG. 1 with the attaching sensor shown in an exploded view.

FIG. 2 shows sensor 100 in exploded view form located above a mounting area 200 on device 10. Mounting plate 202 is affixed to device 10, and in an embodiment includes directional markings in the form of visible arrows to guide proper installation of mounting plate 202 to device 10. Alternatively, or in combination with the visible arrows, bosses are integral to construction of the mating surfaces of mounting plate 202 and base 204 so that sensor 100 is always installed correctly. Base 204 affixes to mounting plate 202 and includes threads that secure fastener 206 over a flanged lip at the bottom of housing 208 to base 204. In an embodiment, seal 210 is provided to prevent moisture or contaminants from entering sensor 100. In an embodiment, sensing module 212 is placed on base 204. Sensing module 212 can be provided in a variety of different configurations, such as a vibration sensor, a heat sensor, a resistance sensor, or any other sensing function desired to monitor device 10 or the surrounding environment. As shown, sensing module includes a vertical portion that attaches to the side of inner housing 214. Inner housing 214 serves a dual purpose. First, inner housing 214 retains battery 216 to power sensor 100, but also serves as a mounting surface for an integrated circuit board (not shown) having controller and communication functions.

Figure 3:
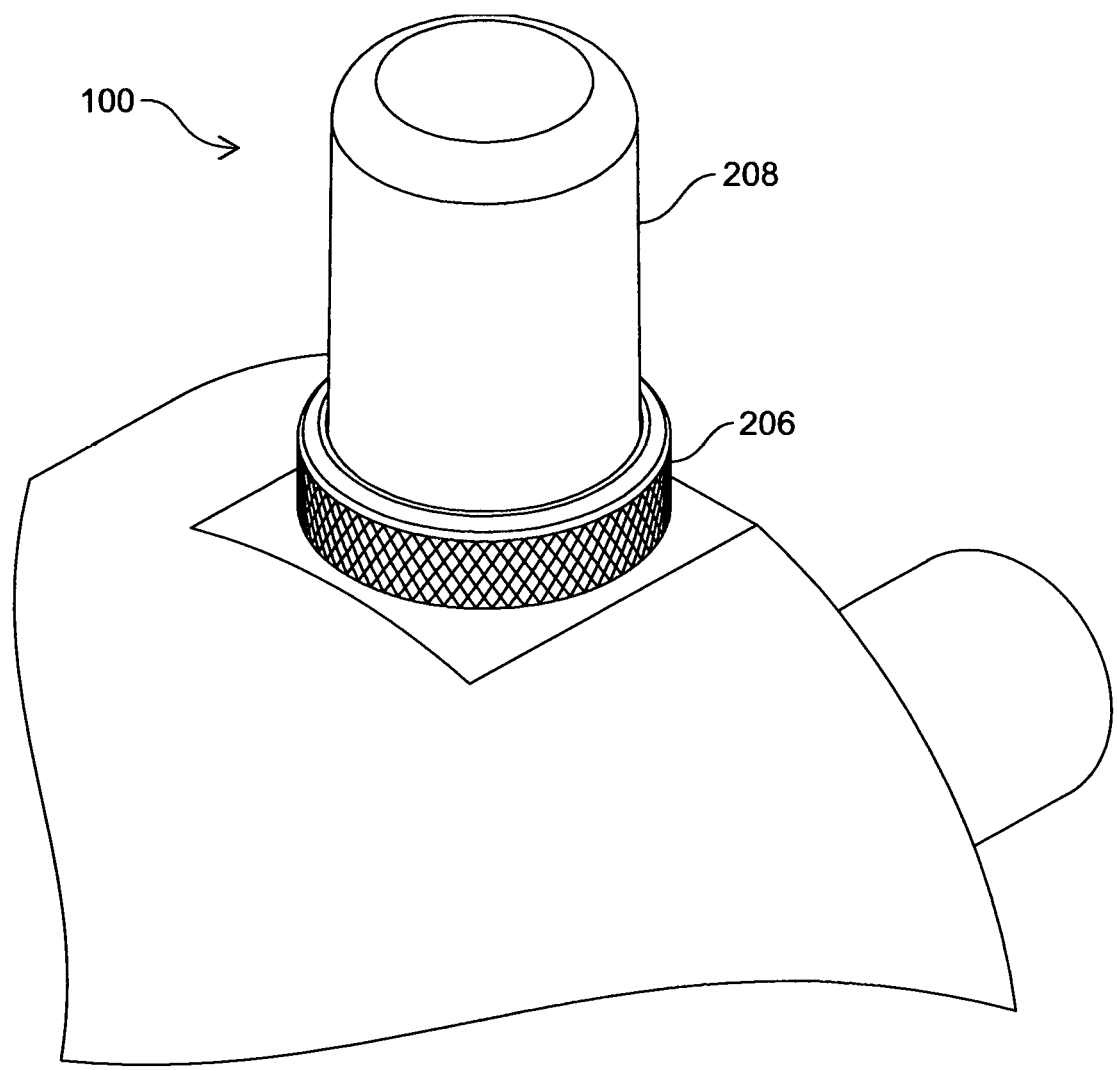
FIG. 3 shows the sensor in an operative position on the device of FIG. 1 and FIG. 2.

FIG. 3 shows sensor 100 in an assembled orientation with housing 208 placed over the internal components shown in the exploded view of FIG. 3. Fastener 206 is easily tightened or loosened so that housing 208 can be easily removed and replaced for battery replacement without removing sensor 100 from the mounting plate 202. However, if sensor 100 is removed from mounting plate 202, it is easily reattached to mounting plate by observing the directional markings on mounting plate 202 shown in FIG. 2. This prevents misalignment of sensor 100 and ensures accurate and meaningful data is obtained by sensor 100.

Figure 4:
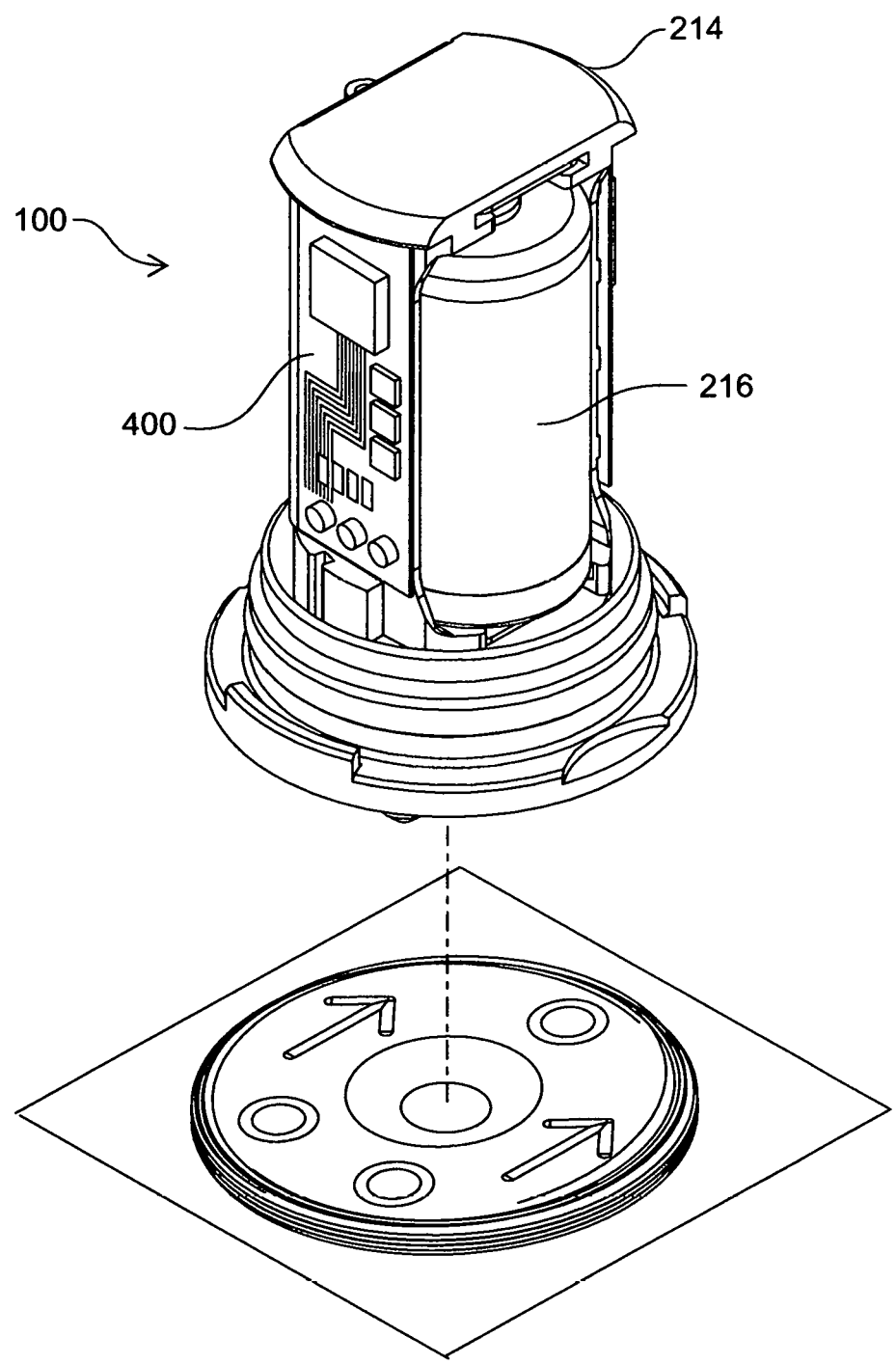
FIG. 4 shows the sensor in a perspective view to show a circuit board included with the sensor and a battery inserted in a housing that supports the circuit board.
Figure 5:
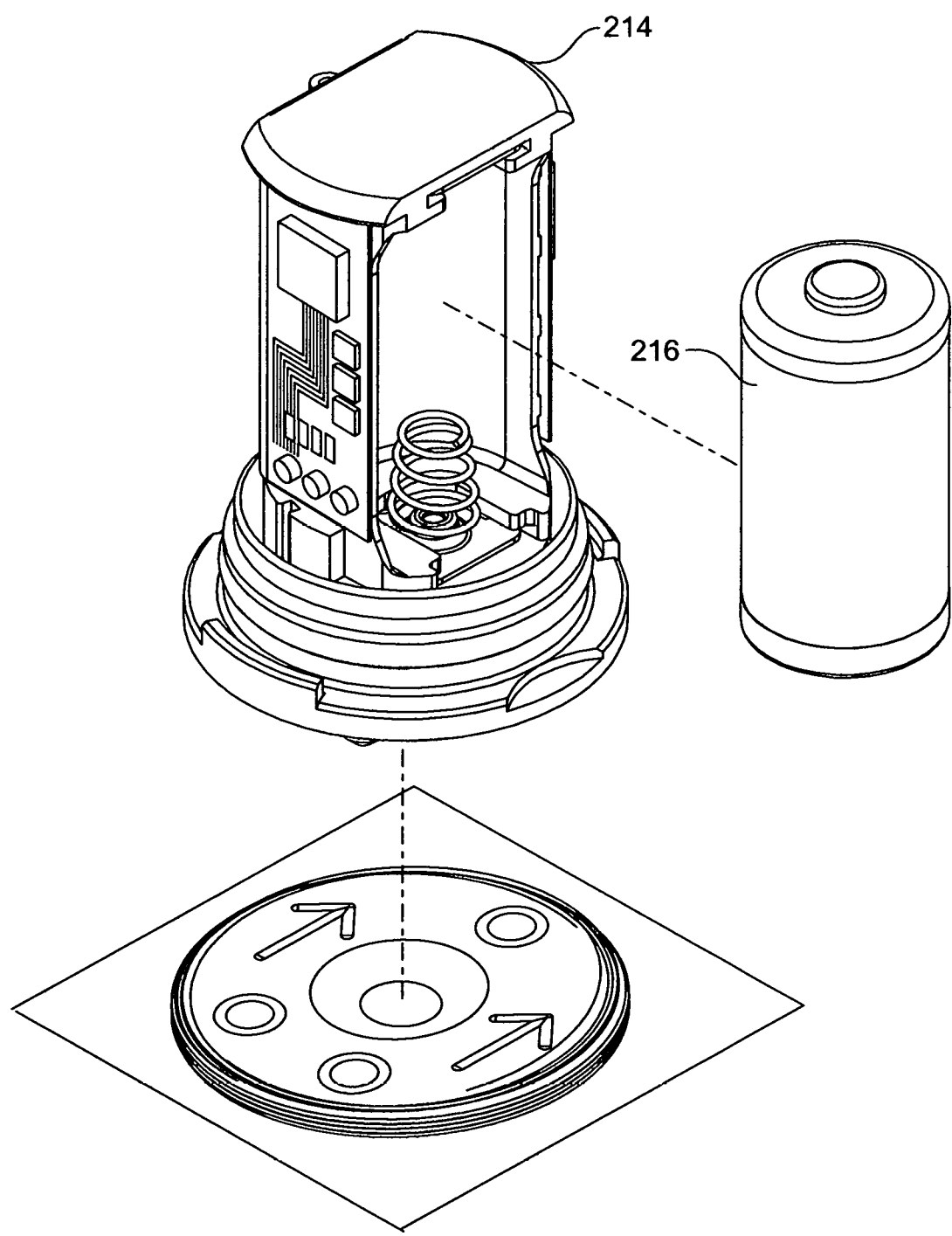
FIG. 5 shows the perspective of FIG. 5, with the battery removed from the housing.

FIG. 4 shows housing 208 once again removed from sensor 100, and also shows circuit board 400. Circuit board 400 serves as controller and also communication with external devices. Typically, circuit board 400 includes a transmitter, receiver, antenna, memory, storage, and instructions for operating sensor 100 and communicating data to external devices. Circuit board 400 can be configured to accommodate the variety of different sensing functions described above with respect to FIG. 1. As shown in FIG. 4, battery 216 is retained in inner housing 214, but is easily removed, as shown in FIG. 5.

Figure 6:
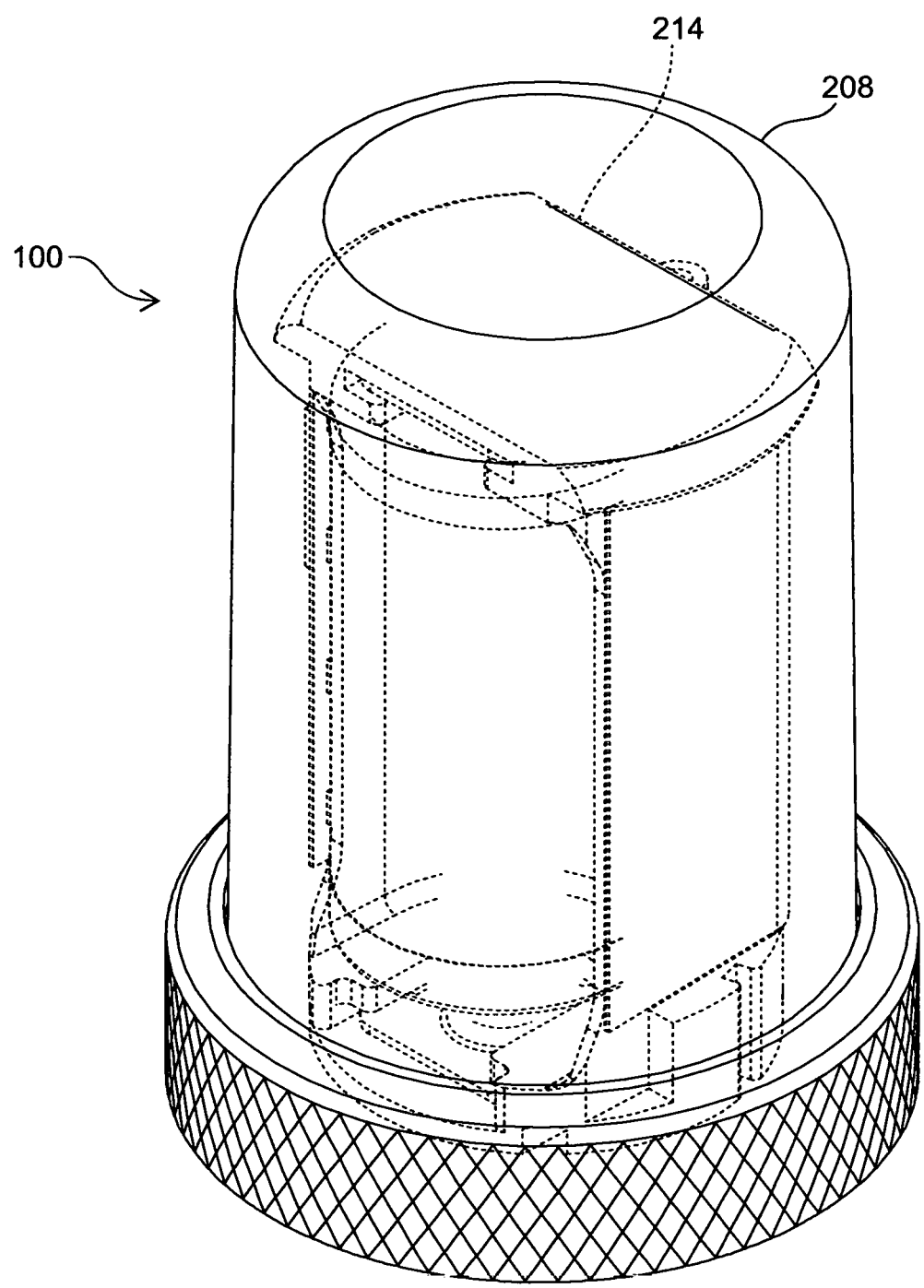
FIG. 6 shows an enlarged perspective view of the sensor.

FIG. 6 shows the internal components of sensor 100 in dashed lines. As shown, housing 208 provides sufficient clearance for inner housing 214.

Figure 7:
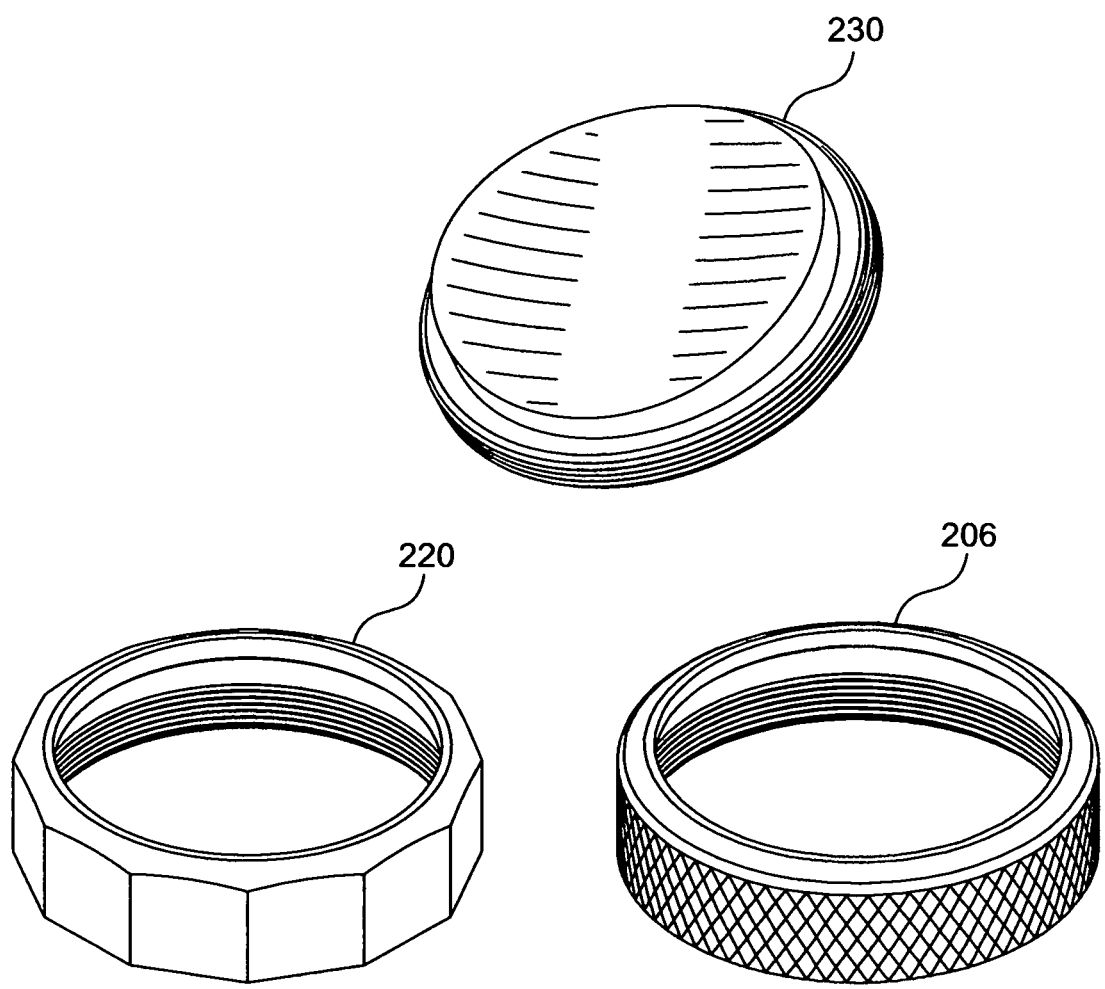
FIG. 7 shows a variety of mounting hardware for use with the sensor.

FIG. 7 shows two variations of fasteners. While fastener 206 includes a knurled surface for easy manipulation without tools, fastener 220 includes faceted surfaces so that a wrench can secure or remove fastener from sensor 100. Also shown in FIG. 7 is curved member 230. While device 10 is shown in FIG. 1 with a flat surface on which sensor 100 is mounted, curved member 230 provides a surface that can be placed face down under sensor 100 to accommodate a curved surface of device 10 if no flat surface is available.

While a sensor according to the present invention has been described and illustrated in detail, it is to be understood that numerous modifications can be made to embodiments of the present invention without departing from the spirit thereof.

We claim:

1. A sensor, comprising:
   a base connected to a mounting plate, the mounting plate fastenable to a device to be monitored and having an alignment indication readable by a human;
   a sensor module configured to monitor the device;
   a housing and a fastener configured to secure the housing to a threaded portion of the base;
   a controller including a circuit board having logical and communication functionality; and
   an inner housing configured to retain a battery and also providing a mounting surface for the controller,
   wherein the housing provides an enclosure for the inner housing, sensor module and mounting plate.

2. The sensor of claim 1, wherein the sensor is disposed in a perpendicular relationship with respect to the device.

3. The sensor of claim 1, wherein the fastener includes a knurled surface.

4. The sensor of claim 1, wherein the fastener includes a faceted surface.

5. The sensor of claim 1, further including a curved member that accommodates a curved surface of a device.

6. The sensor of claim 1, wherein the base is attached to the mounting plate between the mounting plate and a bottom surface of the inner housing.

7. The sensor of claim 6, wherein a vertical portion of the sensor module is configured to attach to a side of the inner housing.

8. The sensor of claim 1, wherein the sensor module comprises a vibration sensor.

9. The sensor of claim 1, wherein the sensor module comprises a temperature sensor.

10. A sensor, comprising:
    a base configured to be connected to a mounting plate attached to a device to be monitored, the mounting plate including directional markings indicating proper placement on the mounting plate, the base having a threaded portion;
    a sensing module, the sensing module configured to observe characteristics exhibited by the device to be monitored;
    a circuit board, the circuit board in communication with the sensing module, the circuit board including controller and communication functions;
    an inner housing, the inner housing configured to retain a battery, the battery for supplying electrical current to the sensing module and the circuit board; and
    a housing that provides an enclosure for the inner housing, sensing module and mounting plate.

11. The sensor of claim 10, wherein the housing includes a lip dimensioned to mate with a fastener that includes threads that match the threaded portion of the base.

* * * * *